P. T. SNYDER.
COOLING FAN AND CONTROLLING MEANS.
APPLICATION FILED APR. 18, 1916.
1,265,271.
Patented May 7, 1918.
2 SHEETS—SHEET 1.
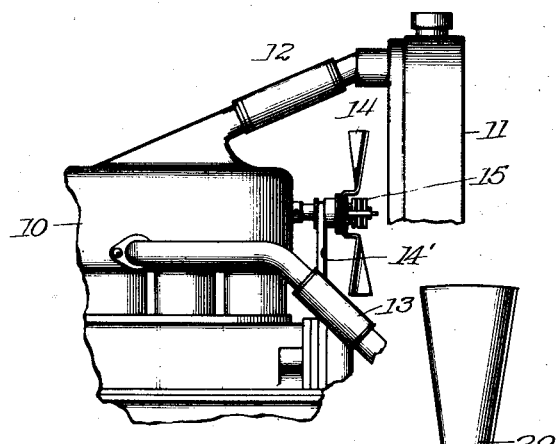
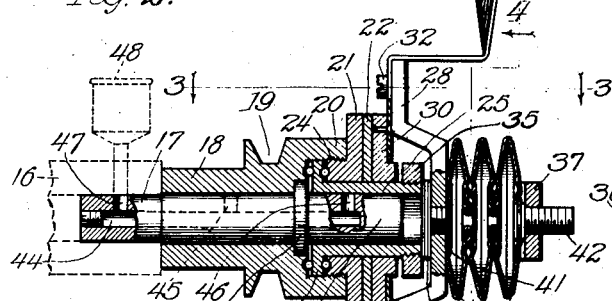
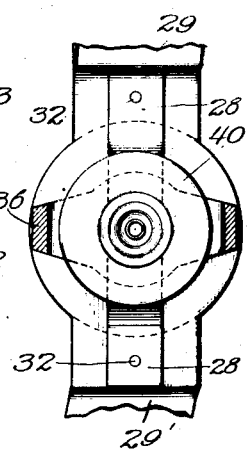
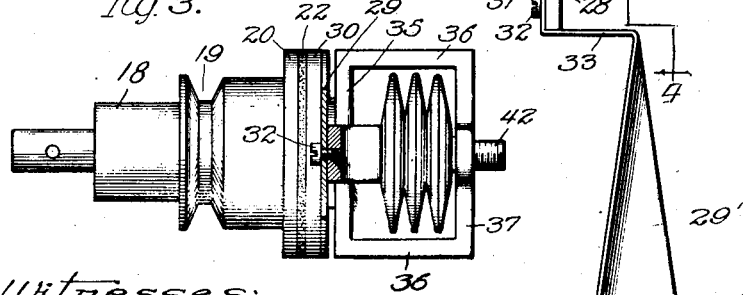
Witnesses:
Robert H. Weir
Arthur W. Carlos
Inventor
Parke T. Snyder
Bree Bain May
Attys.

P. T. SNYDER.
COOLING FAN AND CONTROLLING MEANS.
APPLICATION FILED APR. 18, 1916.
1,265,271.
Patented May 7, 1918.
2 SHEETS—SHEET 2.
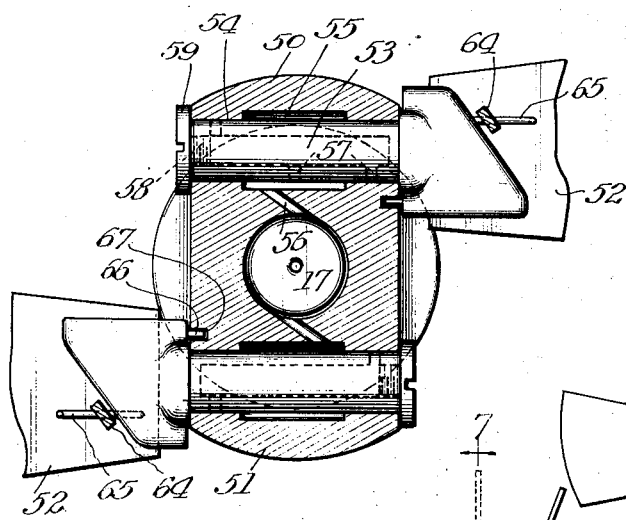
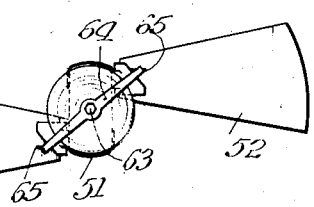
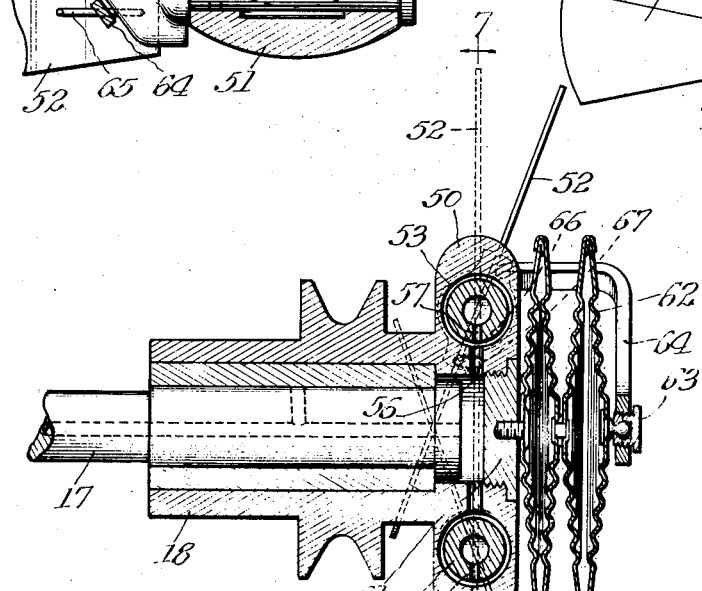
Witnesses:
Robert H. Weir
Arthur W. Carlson
Inventor
Parke T. Snyder
Foree Bain May
Attys.

UNITED STATES PATENT OFFICE.

PARKE T. SNYDER, OF CHICAGO, ILLINOIS, ASSIGNOR OF ONE-HALF TO ROSS J. BEATTY, OF CHICAGO, ILLINOIS.

COOLING-FAN AND CONTROLLING MEANS.

1,265,271.    Specification of Letters Patent.    Patented May 7, 1918.

Application filed April 18, 1916. Serial No. 91,907.

*To all whom it may concern:*

Be it known that I, PARKE T. SNYDER, a citizen of the United States, residing at Chicago, in the county of Cook and State of Illinois, have invented certain new and useful Improvements in Cooling-Fans and Controlling Means, of which the following is a specification.

My invention relates to cooling fans and means responsive to variations in the temperature of the air moved thereby, for controlling the volume of air displaced.

It is an undisputed fact that a properly lubricated internal combustion engine operates at its highest efficiency when the cooling water is in the neighborhood of 200° F. Since automobile radiators are necessarily limited as to size it is customary to provide a fan in order to prevent an increase in cooling water temperature to the boiling point when the engine is working under maximum load, or at maximum speed. The natural result is a material decrease in efficiency when operating at low speeds and light load due to over cooling of the circulation water. Furthermore, the constantly operating fan acts as a positive efficiency reducer in cool weather, and for a considerable time after starting an engine which has been idle long enough to become cool.

The principal object of my invention is to maintain the temperature of the cooling water of a gas engine at the most desirable point irrespective of engine load or speed, and this I accomplish by the combination with a cooling fan of a means responsive to temperature variation for controlling the volume of air displaced by the fan.

A further object of the invention is to control the volume of air displaced by the fan through means responsive to changes in the temperature of the air in the vicinity of the cooling radiator.

The invention, though particularly suited for increasing the efficiency of the cooling systems of motor cars when working under varying conditions, is obviously susceptible of use in combination with fluid circulating fans or pumps used for other purposes.

Other and further objects of my invention will become readily apparent to persons skilled in the art, from a consideration of the following description taken in conjunction with the drawings, wherein:—

Figure 1 is a side elevation of a fragment of an internal combustion engine and radiator showing my automatically controlled fan in position.

Fig. 2 is an enlarged vertical axial sectional view through the fan and controlling means.

Fig. 3 is a transverse sectional view taken on line 3—3 of Fig. 2.

Fig. 4 is a sectional view taken on line 4—4 of Fig. 2.

Fig. 5 is a front elevation of another embodiment of my invention.

Fig. 6 is an enlarged vertical axial sectional view through the same, and;

Fig. 7 is a transverse sectional view taken on line 7—7 of Fig. 6.

In all the views the same reference characters are employed to indicate similar parts.

In general the structures illustrated comprise a pulley wheel belted or geared to a rotating part of an engine, fan blades mounted at the rear of the automobile radiator and arranged for driving connection by the pulley, and a temperature responsive element arranged to control the capacity of the fan blades for drawing air through the apertures in the radiator.

The thermostatic control of the fan as to its air impelling capacity, may obviously be accomplished by a number of forms of connections. For the purpose of clear disclosure I have illustrated two embodiments of the invention.

In Figs. 1 to 4 a thermostatically actuated clutch is shown. Above a predetermined temperature the clutch is closed and the fan rotates at the same speed as its pulley, whereas a drop in temperature causes contraction of the thermostat diaphragms and a consequent separation of the clutch surfaces. In Figs. 5 to 7 a structure is illustrated in which contraction of the thermostatic element due to drop in temperature causes what is termed "feathering" of the blades, the degree of "feather" being dependent upon the temperature of the air contacting with the thermostat.

Referring first to the clutch type illustrated in Figs. 1 to 4, I have indicated at 10 an internal combustion engine, in front of which is mounted a water cooling radiator 11, suitably connected to the engine by water circulating pipes 12 and 13. A cooling fan indicated in general at 14 for drawing air through the air cells of the radiator is suitably mounted between the engine and radiator, a belt 14' driven from the engine supplying power for its rotation. The temperature responsive device 15 is associated with the fan for controlling its operation.

More specifically, as shown in Fig. 2, 16 is a part of the engine frame in which is fixed a bearing stud 17. Rotatable upon the stud 17 is a collar, hub, or sleeve 18 provided with a belt groove 19 and having an extended internally counter-bored and threaded end 20, into which threaded end is screwed a clutch element or member 21 bearing upon its face a leather friction disk 22. The stud 17 is provided with a collar 23 to prevent axial displacement of the sleeve or hub 18. The clutch member 21, which rotates with the sleeve 18 has a tubular screw threaded shoulder 24, the hub 20 being counter-bored for the purpose of receiving this screw threaded shoulder and a space is left between the end of the shoulder and the inner extremity of the counter bore of the hub 20. Rotatable upon the end portion 17', of the stud 17, is a sleeve 25, provided with a flange 26 on its rear end for inclusion in the space between the clutch shoulder 24 and the inner extremity of the counter-bore of the hub 20. A clutch member 30 is loosely mounted on the sleeve 25 and is positively secured to the fan blades 29—29' as by the rivets 31, the fan blades being secured to the arms of the yoke 28, as by screws 32. The fan blades are bent into planes parallel with the axis, as at 33, and then radially, so as to bring the blades nearer to the inner surface of the radiator 11. Screwed to the outer threaded terminal of the sleeve 25 is a rectangularly shaped housing 35 having forwardly extending parallel members 36—36 and a transversely extending part 37.

A temperature-responsive, expanding bellows diaphragm 40, containing a suitable expansible fluid and provided with axially positioned projections 41 and 42 is positioned within the housing 35. The projection 41 extends through the yoke 28 of the fan, to support the diaphragm in place thereon and the projection 42 extends through the housing member 37 to axially support the outer end of the diaphragm. The hub or sleeve 18 is rotatable upon the stud 17, independently of the fan, and the fan controlling thermostatic device.

As shown in Fig. 2, the fan is in driving relation with the rotatable clutch member 21, the clutch member 30 being held firmly in frictional engaging driving relation therewith by the expanded diaphragm. When the diaphragm is fully expanded, as shown in Fig. 2, its outer end bears against the housing member 37, which tends to pull the sleeve 25 and clutch member 21, outwardly and press the clutch member 30 rearwardly thereby bringing the clutch member 21 and the leather 22, which may be carried by either member, into tight driving relation with the clutch member 30. The rear end of the expanding diaphragm pushes against the yoke 28 causing the clutch member 30 to be forcibly pressed rearwardly into driving relation with the coöperating clutch member 21 in a manner clearly shown by the drawings.

When the air passing through the radiator, and moved by the fan is of a temperature sufficient to expand the temperature responsive medium, within the expanding diaphragm chamber 40, the clutch members are thereby brought into driving relation and the fan is rotated. The rotation of the fan causes a strong blast of air to be forcibly drawn through the radiator and therefore the temperature of the contained water is reduced, by the more rapid carrying away of its heat. When the temperature of the water drops below a predetermined value the temperature of the air passing through the radiator is correspondingly decreased causing contraction of the diaphragm 40, thereby separating the clutch members 21 and 30, to such extent as to cause more or less slip between said engaging clutch members, thus reducing the speed of the fan. When contraction of the expanding medium within the diaphragms is sufficient, an entire separation of the clutch members is produced, thereby causing the fan to stop, notwithstanding the continued rotation of the clutch member 21.

By this means the speed of the fan is regulated proportional to the temperature of the circulating water, or entirely stopped, when the temperature of the water has been sufficiently reduced.

The stationary stud 17 is preferably hollow, as at 44, to provide an oil way with outlets 45 and 46 and inlet 47. The first mentioned outlets are to supply oil for the sleeve 18 and the sleeve 25 and the latter to provide an inlet for the oil from the cup 48.

In the modification shown in Figs. 5 to 7 inclusive, I have illustrated a device operable by the thermostat, for "feathering" the blades or changing their angularity with reference to the plane of rotation, instead of means for varying the speed of the fan to accomplish the same result.

In the modification the driving hub or pulley 18 is laterally elongated at its outer end, as at 50—51, to form a T head. The fan blades 52—52, which are substantial duplicates of each other, are provided with tubular stub shafts 53—53 at their inner ends. The end portions 50—51 of the head are bored out as at 54 and counter bored at 55 to provide bearings for the fan blade shafts 53, suitable lubrication being provided by the passages 56, and openings 57 in the stub shafts. A stud 58 is screw threaded into the end of each stub shaft and is provided with a large head 59 to prevent axial displacement.

A cap 61 screw threaded into the open end of the tubular drive member 18 serves as a fixed abutment for the inner end of the bellows diaphragm 62, the outer end of which is connected through an adjustable ball and socket joint 63 with the center of a U-shaped yoke 64. On the front face of each blade 52, at one side of the axis of stub shaft 53 is provided a rod 65, the ends of which are down turned and riveted into the blade. The ends of the U-shaped yoke 64 are perforated to make sliding engagement with the rods 65 and it will be obvious that axial movement of yoke 64 causes rotation of the blades about their stub shafts 53. The range of movement is but slight, varying from the position indicated in dotted lines in Fig. 6 at which point they lie in the plane of fan rotation, to a maximum inclination indicated in solid lines when a maximum volume of air is displaced. Pins 66 project from the fan blades into arcuate slots 67 in the head to provide stops limiting the extent of oscillation of the blades upon their pivots.

When the heat responsive device, or expanding diaphragm 62 is collapsed, by the contraction of the expansible fluid contained therein, the ends of the yoke 64 are drawn inwardly, whereupon the rods 65 are acted upon by the respective limbs to rotate the fan blades 52 into a plane at a right angle to the axis of rotation, at which time the fan blades, of course, will be inactive and will not draw any air through the radiator. An increase of air temperature will expand the heat responsive medium within the diaphragm 62, moving the yoke piece 64 outwardly drawing the edges of the blades forwardly and bringing the fan blades into planes, oblique to the inactive plane in which they were positioned.

When the expansible diaphragm 62 is contracted, to some extent, it draws the blades into a position intermediate the two extremes consequently reducing the capacity of the fan as an air propeller.

It is evident that other temperature responsive devices than that shown may be employed for controlling the fan operation for either embodiment shown and described.

While I have herein shown two embodiments of my invention, it will be manifest to persons skilled in the art, that there are many other forms and deviations which my invention may take without departing from the scope of the appended claims.

Having described my invention, what I claim is:—

1. The combination with a fan, of means for varying the air moving capacity thereof, and a temperature responsive device carried by the fan and connected with said means.

2. The combination with an automobile radiator and cooling fan, of means for varying the air moving capacity of the fan, and a temperature responsive device connected with said means and carried by the fan between the radiator and fan.

3. The combination with a rotatable fan, of means carried by said rotatable fan for varying the air moving capacity thereof, and a temperature responsive device carried by said rotatable fan and connected with the aforesaid means for operation thereof.

4. The combination with a rotatable fan comprising a hub and fan blades carried thereby, of means carried by said fan for varying the air moving capacity of the blades, and a temperature responsive device carried by the hub and connected with the aforesaid means for operation thereof.

5. The combination with an automobile radiator and cooling fan positioned at the rear thereof, of means carried by the fan for varying the air moving capacity thereof, and a temperature responsive means carried by the front end of the fan in close proximity to the radiator, and connected with the aforesaid means for operation thereof.

6. The combination with a rotatable fan comprising a hub and fan blades carried thereby, of means for varying the air moving capacity of said fan, and a thermostatic bellows diaphragm coaxially mounted on the front of said hub, and connected with the aforesaid means for operation thereof.

7. The combination with an automobile radiator cooling fan, of means for varying the air moving capacity thereof, a bellows diaphragm carried by the fan, means for preventing movement of one end of the diaphragm with respect to the fan, and a connection between the other end of the diaphragm and the means for varying the air moving capacity of the fan.

8. The combination of an automobile radiator cooling fan comprising a hub and fan blades pivotally mounted at their bases in the hub to permit movement of the blades from their normal air displacing positions into the plane of fan rotation, a temperature responsive means carried by the fan, and connections between said temperature responsive means and each fan blade.

9. The combination of an automobile radiator cooling fan comprising a hub and fan blades pivotally mounted at their bases in the hub to permit movement of the blades from their normal air displacing positions into the plane of fan rotation, a temperature responsive means carried by the fan, and connections between said temperature responsive means and each fan blade at one side of the axis upon which the blade is movable with respect to the hub.

10. The combination of an automobile radiator cooling fan comprising a hub and fan blades pivotally mounted at their bases in the hub to permit movement of the blades from their normal air displacing positions into the plane of fan rotation, a temperature responsive means carried by the fan at the axis thereof and having a part axially movable in response to temperature changes, and a connection between the movable part of said temperature responsive means and each fan blade whereby movement of the former causes movement of the fan blades about their pivotal connections with the hub.

11. A rotary flow inducing device and a thermostat which rotates with and is carried by said device for automatically varying the flow inducing capacity of the device as the temperature of the medium on which the device works varies.

12. A flow inducing fan having adjustable fan blades and a thermostat carried by the fan and rotatable therewith and operatively connected to the blades so as to vary the angularity of the blades in accordance with changes of temperature of the medium on which the blades work.

In testimony whereof I hereunto set my hand in the presence of two subscribing witnesses.

PARKE T. SNYDER.

In the presence of—
STANLEY W. COOK,
MARY F. ALLEN.